(12) United States Patent
Burte

(10) Patent No.: US 10,882,500 B2
(45) Date of Patent: Jan. 5, 2021

(54) SYSTEMS AND METHODS FOR BRAKE FAILURE DETECTION USING RETRACT BRAKING

(71) Applicant: GOODRICH CORPORATION, Charlotte, NC (US)

(72) Inventor: Paul R. Burte, Clayton, OH (US)

(73) Assignee: Raytheon Technologies Corporation, Farmington, CT (US)

( * ) Notice: Subject to any disclaimer, the term of this patent is extended or adjusted under 35 U.S.C. 154(b) by 148 days.

(21) Appl. No.: 16/206,482

(22) Filed: Nov. 30, 2018

(65) Prior Publication Data

US 2020/0172066 A1 Jun. 4, 2020

(51) Int. Cl.

| B60T 8/32 | (2006.01) |
|---|---|
| B60T 8/88 | (2006.01) |
| B60T 17/22 | (2006.01) |
| B64C 25/34 | (2006.01) |
| B64C 25/42 | (2006.01) |
| B64D 45/00 | (2006.01) |
| B64C 25/24 | (2006.01) |

(52) U.S. Cl.
CPC .............. *B60T 8/325* (2013.01); *B60T 8/885* (2013.01); *B60T 17/221* (2013.01); *B64C 25/34* (2013.01); *B64C 25/426* (2013.01); *B64D 45/00* (2013.01); *B60T 2240/00* (2013.01); *B60T 2240/04* (2013.01); *B64C 25/24* (2013.01); *B64D 2045/0085* (2013.01)

(58) Field of Classification Search
CPC ........ B60T 8/325; B60T 8/885; B60T 17/221; B60T 2240/00; B60T 2240/04; B60T 13/662; B60T 2270/406; B60T 8/1703; B64C 25/34; B64C 25/426; B64C 25/24; B64D 45/00; B64D 2045/0085
See application file for complete search history.

(56) References Cited

U.S. PATENT DOCUMENTS

| 3,926,479 A | 12/1975 | Bissell et al. |
|---|---|---|
| 5,655,408 A | 8/1997 | Sakakiyama et al. |
| 6,513,885 B1 | 2/2003 | Salamat et al. |
| 6,704,634 B1 | 3/2004 | Gowan et al. |
| 2008/0150353 A1 | 6/2008 | Griffith et al. |

(Continued)

FOREIGN PATENT DOCUMENTS

| EP | 2565093 | 3/2013 |
|---|---|---|
| EP | 3257712 | 12/2017 |
| WO | 0069721 | 11/2000 |

OTHER PUBLICATIONS

European Patent Office, European Search Report dated Feb. 6, 2020 in Application No. 19208150.3.

*Primary Examiner* — Rodney A Butler
(74) *Attorney, Agent, or Firm* — Snell & Wilmer L.L.P.

(57) ABSTRACT

A system for detecting aircraft brake failure using retract braking may comprise a landing gear including a wheel, a brake coupled to the wheel, and a wheel sensor coupled to the wheel. A brake controller may be coupled to the brake and the wheel sensor. The brake controller may be configured to receive a begin retract braking signal, command the brake to apply a braking force to the wheel, calculate a wheel speed characteristic using data from the wheel sensor, and determine whether the wheel speed characteristic indicates a failure of the brake.

15 Claims, 5 Drawing Sheets

(56) References Cited

U.S. PATENT DOCUMENTS

| | | | |
|---|---|---|---|
| 2013/0060404 A1* | 3/2013 | Cahill | B60T 17/221 |
| | | | 701/3 |
| 2017/0369047 A1 | 12/2017 | Okada et al. | |
| 2018/0017467 A1 | 1/2018 | Hiruta et al. | |
| 2018/0281768 A1* | 10/2018 | Wingate | F02C 3/073 |
| 2019/0263506 A1* | 8/2019 | Hubbard | B60T 8/1703 |

* cited by examiner

SYSTEMS AND METHODS FOR BRAKE FAILURE DETECTION USING RETRACT BRAKING

FIELD

The present disclosure relates generally to the field of brake control systems, and more specifically to systems and methods for detecting brake failure using retract braking.

BACKGROUND

Aircraft typically include landing gear configured to support the aircraft on the ground during, for example, taxi, take-off, and landing. A brake may be operatively coupled to one or more wheels of the landing gear. Aircraft brakes can have dormant failures that may be undetectable by current systems and methodology. Undetected brake failures present safety concerns, as failed brakes can lead to more serious aircraft failure scenarios.

SUMMARY

A system for detecting aircraft brake failure using retract braking is disclosed herein. In accordance with various embodiments, the system may comprise a landing gear comprising a wheel, a brake coupled to the wheel, and a wheel sensor coupled to the wheel. A brake controller may be coupled to the brake and the wheel sensor. A tangible, non-transitory memory may be configured to communicate with the brake controller. The tangible, non-transitory memory may have instructions stored thereon that, in response to execution by the brake controller, cause the brake controller to perform operations comprising: receiving a begin retract braking signal, commanding the brake to apply a braking force to the wheel, receiving data from the wheel sensor, calculating a wheel speed characteristic for the wheel based on the data from the wheel sensor, and determining whether the wheel speed characteristic indicates a failure of the brake.

In various embodiments, a landing gear controller may be coupled to the landing gear and the brake controller. The landing gear controller may be configured to send the begin retract braking signal to the brake controller. In various embodiments, a weight on wheels sensor may be coupled to the landing gear. The landing gear controller may be configured to send the begin retract braking signal in response to receiving a weight off wheels signal from the weight on wheels sensor.

In various embodiments, a weight on wheels sensor may be coupled to the landing gear. The weight on wheels sensor may be configured to send a weight off wheels signal to the landing gear controller. A pilot gear handle may be coupled to the landing gear controller. The pilot gear handle may be configured to send a gear handle up signal to the landing gear controller. The gear handle up signal may indicate the pilot gear handle is in a landing gear up position. A landing gear lock may be coupled to the landing gear. The landing gear lock may be configured to send a gear unlocked signal to the landing gear controller. The gear unlocked signal may indicate the landing gear is in an unlocked position. The landing gear controller may be configured to send the begin retract braking signal to the brake controller in response to receiving the weight off wheels signal and at least one of the gear handle up signal or the gear unlocked signal.

In various embodiments, a brake sensor may be coupled to the brake. The brake sensor may be configured to output braking feedback data to the brake controller. The step of determining whether the wheel speed characteristic indicates the failure of the brake may comprise: calculating an expected wheel speed characteristic based on the braking feedback data output from the brake sensor, determining a difference between the wheel speed characteristic and the expected wheel speed characteristic, and comparing the difference between the wheel speed characteristic and the expected wheel speed characteristic to a threshold difference.

In various embodiments, the operations may further comprise generating an alert if the wheel speed characteristic indicates the failure of the brake. In various embodiments, the step of determining whether the wheel speed characteristic indicates the failure of the brake may comprise comparing the wheel speed characteristic to a threshold wheel speed characteristic. In various embodiments, the wheel speed characteristic may be at least one of an angular velocity of the wheel or a deceleration of the wheel.

A method of detecting aircraft brake failure using retract braking is also disclosed herein. In accordance with various embodiments, the method may comprise receiving, by a brake controller, a begin retract braking signal; commanding, by the brake controller, a brake to apply a braking force to a wheel; calculating, by the brake controller, a wheel speed characteristic of the wheel; and determining, by the brake controller, whether the wheel speed characteristic indicates a failure of the brake.

In various embodiments, the method may further comprise generating, by the brake controller, an alert if the wheel speed characteristic indicates the failure of the brake. In various embodiments, the step of determining whether the wheel speed characteristic indicates the failure of the brake may comprise: calculating, by the brake controller, an expected wheel speed characteristic based on a braking signal output from a brake sensor coupled to the brake; determining, by the brake controller, a difference between the wheel speed characteristic and the expected wheel speed characteristic; and comparing, by the brake controller, the difference between the wheel speed characteristic and the expected wheel speed characteristic to a threshold discrepancy value.

In various embodiments, the method may further comprise receiving, by the brake controller, data from a wheel sensor coupled to the wheel. The wheel speed characteristic of the wheel may be calculated using the data from the wheel sensor. In various embodiments, wheel speed characteristic may be at least one of an angular velocity of the wheel or a deceleration of the wheel.

In various embodiments, the method may further comprise receiving, by a landing gear controller, a weight off wheels signal from a weight on wheels sensor and at least one of a gear handle up signal or a gear unlocked signal; and sending, by the landing gear controller, the begin retract braking signal to the brake controller. The gear handle up signal may indicate a pilot landing gear handle is in a landing gear up position. The gear unlocked signal may indicate a landing gear comprising the wheel is in an unlocked position.

An article of manufacture is also disclosed herein. The article of manufacture includes a non-transitory, tangible computer readable storage medium having instructions stored thereon that, in response to execution by a brake controller, cause the brake controller to perform operations. In accordance with various embodiments, the operations may comprise receiving a begin retract braking signal, commanding a brake to apply a braking force to a wheel, receiving data from a wheel sensor coupled to the wheel, calculating a wheel speed characteristic of the wheel based on the data, and determining whether the wheel speed characteristic indicates a failure of the brake.

In various embodiments, the operations may further comprise generating an alert if the wheel speed characteristic indicates the failure of the brake.

In various embodiments, the step of determining whether the wheel speed characteristic indicates the failure of the brake may comprise calculating an expected wheel speed characteristic based on the braking force applied to the wheel, determining a difference between the wheel speed characteristic and the expected wheel speed characteristic, and comparing the difference between the wheel speed characteristic and the expected wheel speed characteristic to a threshold discrepancy value.

In various embodiments, the step of calculating the expected wheel speed characteristic may comprise receiving braking feedback data from a brake sensor coupled to the brake and calculating the expected wheel speed characteristic using the braking feedback data.

In various embodiments, the begin retract braking signal may comprise a weight off wheel signal and at least one of a gear handle up signal or a gear unlocked signal. The gear handle up signal may indicate a pilot landing gear handle is in a landing gear up position. The gear unlocked signal may indicate a landing gear comprising the wheel is in an unlocked position. In various embodiments, the begin retract braking signal may be sent from a landing gear controller.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
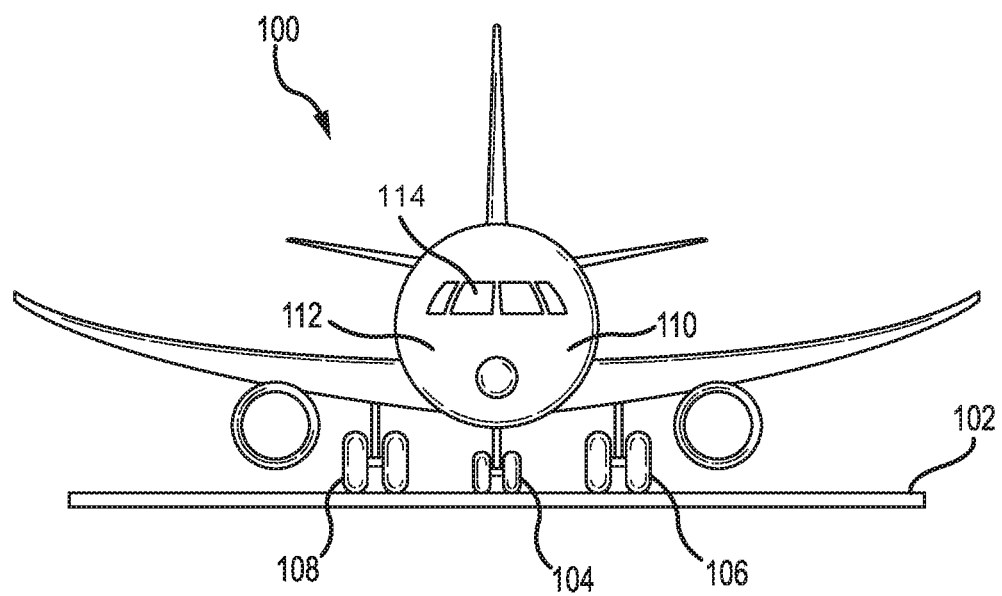
FIG. 1 illustrates an aircraft, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for detecting a brake failure or brake malfunction using retract braking. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

The actuator rams may be electrically operated actuator rams or hydraulically operated actuator rams, although some brakes may use pneumatically operated actuator rams. A brake controller may be operationally coupled to, and may control actuation of, the actuator rams. The brake controller may comprise a processor and a tangible, non-transitory memory. The brake controller may comprise one or more logic modules that implement brake logic.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

With reference to FIG. 1, aircraft 100 on runway 102 is shown. Aircraft 100 may comprise left landing gear 106 and right landing gear 108. A nose landing gear 104 is located under the nose of aircraft 100 and may not include a brake. Aircraft 100 may comprise a brake controller 110 and a landing gear controller 112. Landing gear controller 112 may be configured to control retraction of nose landing gear 104 and left and right landing gear 106, 108 into and out of wheel wells of aircraft 100. For example, landing gear controller 112 may cause nose landing gear 104 and left and right landing gear 106, 108 to retract (i.e., translate into the aircraft body) after take-off and unretract (i.e., translate out of the aircraft body) prior to landing. A pilot gear handle 114 may be located in a cockpit of aircraft 100. Pilot gear handle 114 may be operationally coupled to landing gear controller 112 such that actuation of pilot gear handle 114 causes landing gear controller 112 to retract or unretract nose landing gear 104 and left and right landing gear 106, 108. For example, translating pilot gear handle 114 to a landing gear up position may cause nose landing gear 104 and left and right landing gear 106, 108 to retract into the aircraft body, and translating pilot gear handle 114 to a landing gear down position may cause nose landing gear 104 and left and right landing gear 106, 108 unretract out of the aircraft body.

Aircraft 100 may include sensors that detect aircraft status information. Aircraft status information may mean any information relating to the status of 100 aircraft, for example, the presence of weight on wheels, aircraft velocity, aircraft acceleration, landing gear position, wheel position, wheel velocity, wheel acceleration, air temperature, the pressure applied to the brake stack during braking, global positioning system coordinates, and the like. Landing gear controller 112 and/or brake controller 110 may have access to various aircraft status information at any given time.

Figure 2A:
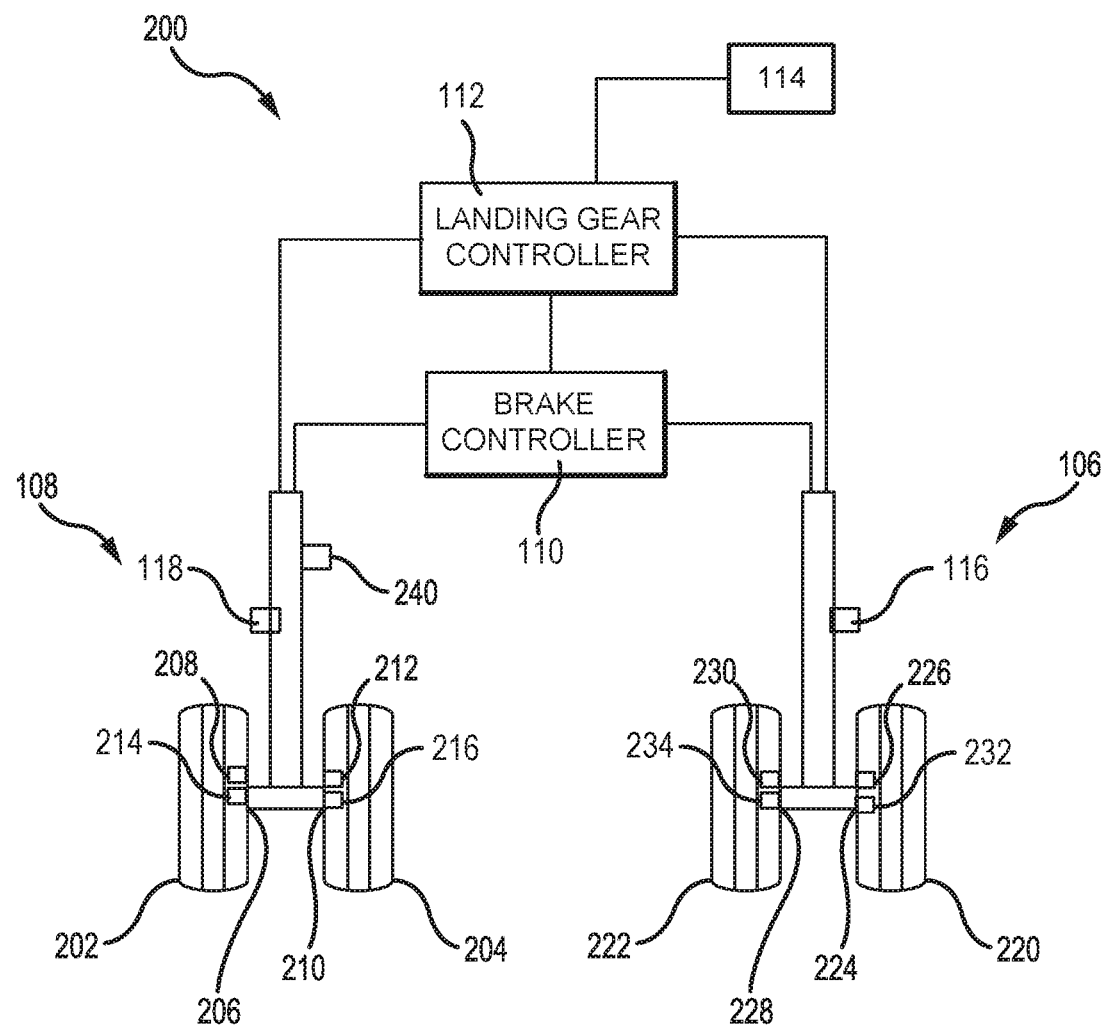
FIG. 2A illustrates landing gear including a system for detecting brake failure using retract braking, in accordance with various embodiments.

With reference to FIG. 2A, a system 200 for detecting brake failure using retract braking is shown, in accordance with various embodiments. System 200 includes landing gear controller 112 and brake controller 110. Landing gear controller 112 may be in electrical (wired or wireless) communication with brake controller 110. Landing gear controller 112 may be configured to control retraction of left and right landing gear 106, 108. Brake controller 110 may be configured to control braking of left and right landing gear 106, 108. For example, brake controller 110 may be configured to cause a braking force to be applied to the wheels of left and right landing gear 106, 108.

In various embodiments, right landing gear 108 may comprise a plurality of wheels, such as right outboard (ROB) wheel 202 and right inboard (RIB) wheel 204. ROB wheel 202 may comprise a ROB brake 206. RIB wheel 204 may comprise a RIB brake 210. ROB brake 206 and RIB brake 210 may be mounted to ROB wheel 202 and RIB wheel 204, respectively, to apply and release braking force on each respective wheel.

Left landing gear 106 may comprise a plurality of wheels, such as left outboard (LOB) wheel 220 and left inboard (LIB) wheel 222. LOB wheel 220 may comprise a LOB brake 224. LIB wheel 222 may comprise a LIB brake 228. LOB brake 224 and LIB brake 228 may be mounted to LOB wheel 220 and LIB wheel 222, respectively, to apply and release braking force on each respective wheel. While FIG. 2A illustrates system 200 comprising two landing gears (i.e., left landing gear 106 and right landing gear 108) with four total wheels, it is further contemplated and understood that the systems and methods for brake failure detection using retract braking described herein may apply to systems comprising any number of landing gear and/or wheels.

Left and right landing gear 106, 108 may each comprise a plurality of sensors. For example, each brake may include a sensor for detecting a braking pressure or a braking force applied to the respective wheel, and each wheel may include a sensor for detecting a rotational velocity of the respective wheel.

In various embodiments, right landing gear 108 may include a ROB wheel sensor 208, a RIB wheel sensor 212, a ROB brake sensor 214, and RIB brake sensor 216. ROB brake sensor 214 may detect a pressure or a force applied to ROB wheel 202 by ROB brake 206. RIB brake sensor 216 may detect a pressure or a force applied to RIB wheel 204 by RIB brake 210. ROB wheel sensor 208 and RIB wheel sensor 212 may be coupled to ROB wheel 202 and RIB wheel 204, respectively, to measure one or more wheel speed characteristic(s) of the respective wheels. The wheel speed characteristic(s) may comprise a velocity, acceleration, and/or deceleration of the wheel. The wheel speed characteristics may be measured in terms of linear or angular position, linear or angular velocity, linear or angular acceleration, or other measurement unit.

Left landing gear 106 may include a LOB wheel sensor 226, a LIB wheel sensor 230, a LOB brake sensor 232, and a LIB brake sensor 234. LOB brake sensor 232 may detect a pressure or a force applied to LOB wheel 220 by LOB brake 224. LIB brake sensor 234 may detect a pressure or a force applied to LIB wheel 222 by LIB brake 228. LOB wheel sensor 226 and LIB wheel sensor 230 may be coupled to each respective wheel to measure one or more wheel speed characteristic(s) of the wheel. The wheel speed characteristic(s) may comprise a velocity, acceleration, and/or deceleration of the wheel. The wheel speed characteristics may be measured in terms of linear or angular position, linear or angular velocity, linear or angular acceleration, or other measurement unit.

In various embodiments, ROB brake sensor 214, RIB brake sensor 216, LOB brake sensor 232, and LIB brake sensor 234 may detect a pressure applied to the respective wheel by a hydraulic or pneumatic actuator ram. In various embodiments, ROB brake sensor 214, RIB brake sensor 216, LOB brake sensor 232, and LIB brake sensor 234 may be force sensors, such as a load cell, which may detect a force applied to the respective wheel by an electromechanical actuator. In various embodiments, ROB wheel sensor 208, RIB wheel sensor 212, LOB wheel sensor 226, and LIB wheel sensor 230 may comprise wheel speed sensors that output signals indicative of angular velocity or angular displacement, for example, a Hall effect sensor, variable resistance sensor, or the like. In various embodiments ROB wheel sensor 208, RIB wheel sensor 212, LOB wheel sensor 226, and LIB wheel sensor 230 may each comprise a plurality of sensors, for example, a wheel speed sensor and an accelerometer or other sensor. The data output from ROB wheel sensor 208, RIB wheel sensor 212, LOB wheel sensor 226, and LIB wheel sensor 230 may be sent to brake controller 110. Brake controller 110 may use data output from ROB wheel sensor 208, RIB wheel sensor 212, LOB wheel sensor 226, and LIB wheel sensor 230 to calculate or estimate a rotational velocity, acceleration, and/or deceleration of each wheel.

System 200 further comprises a weight-on-wheels (WOW) sensor 240 configured to detect whether the aircraft is on the ground. After takeoff, for example, WOW sensor 240 may output a signal indicating there is no weight on wheels, thus indicating that the aircraft is in flight, i.e., that weight is off wheels, which may be referred to as "weight-off-wheels" (WOFFW) signal.

After takeoff, WOW sensor 240 may change from an on-ground state to an in-flight state. Landing gear controller 112 may be in electrical communication (e.g., wired or wireless) with WOW sensor 240. Landing gear controller 112 may also be in electrical communication with pilot gear handle 114 and one or more landing gear locks 116, 118.

Pilot gear handle 114 may be configured to send a gear handle up signal to landing gear controller 112. The gear handle up signal may indicate that the pilot has moved pilot gear handle 114 to the landing gear up position. Landing gear lock 116 may be configured to send an unlocked gear signal to landing gear controller 112. The unlocked gear signal may indicate that left landing gear 106 is in a down and unlocked position and is therefore ready to retract. Landing gear lock 118 may be configured to send an unlocked gear signal to landing gear controller 112. The unlocked gear signal may indicate that right landing gear 108 is in a down and unlocked position and is therefore ready to retract. In various embodiment, left and right landing gear 106, 108 may be configured such that they cannot be retracted when in a down and locked position. As discussed in further detail below, landing gear controller 112 may send a gear retract command to left and right landing gear 106, 108 and a begin retract braking command to brake controller 110 in response to receiving a WOFFW signal from WOW sensor 240, a gear handle up signal from pilot gear handle 114, and/or a gear unlocked signal from landing gear locks 116, 118.

In various embodiments, landing gear controller 112 includes or communicates with one or more processors and one or more tangible, non-transitory memories and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof. In various embodiments, landing gear controller 112 is configured to send the gear retract command and the begin retract braking command in response to receiving a WOFFW signal from WOW sensor 240 and at least one of the gear handle up signal or the gear unlocked signal. For example, landing gear controller 112 may issue the gear retract and being retract braking commands in response to the pilot translating pilot gear handle 114 to a landing gear up position and WOW sensor 240 being in an in-flight state (i.e., outputting a WOFFW signal), or landing gear controller 112 may send the gear retract and begin retract braking commands in response to left and right landing gear 106 and 108 being in an unlocked position and WOW sensor 240 being in an in-flight state. Left and right landing gear 106, 108 may begin to retract into the aircraft body, in response to receiving the gear retract command from landing gear controller 112.

In response to receiving the WOFFW signal and the handle up position signal and/or the gear unlocked signal, landing gear controller 112 also sends the begin retract braking signal to brake controller 110. In response to receiving the begin retract braking signal from landing gear controller 112, brake controller 110 may command ROB brake 206, RIB brake 210, LOB brake 224, and LIB brake 228 to apply braking force, respectively, to ROB wheel 202, RIB wheel 204, LOB wheel 220, and LIB wheel 222. In this regard, the gear retract braking may begin after the aircraft wheels are no longer in contact with the ground and the landing gear retract command has been issued by landing gear controller 112. In various embodiments, landing gear controller 112 sending the begin retract braking signal may include landing gear controller 112 sending a signal corresponding to the weight off wheel signal and the gear handle up signal and the gear unlocked signal to brake controller 110. In this regard, the begin retract braking signal may comprise the weight off wheel signal and the gear handle up signal indicating a pilot gear handle 114 is in the landing gear up position and/or the WOFFW signal and the gear unlocked signal indicating left and right landing gear 106, 108 are in the unlocked position.

Brake controller 110 is in electrical communication with right landing gear 108 and left landing gear 106. In response to receiving the begin retract braking signal, brake controller 110 commands ROB brake 206, RIB brake 210, LOB brake 224, and LIB brake 228 to apply a braking force to ROB wheel 202, RIB wheel 204, LOB wheel 220, and LIB wheel 222, thereby causing ROB wheel 202, RIB wheel 204, LOB wheel 220, and LIB wheel 222 to decelerate. After sending the apply braking force command, brake controller 110 may determine if ROB brake 206, RIB brake 210, LOB brake 224, and/or LIB brake 228 is failing. Brake controller 110 may calculate a wheel speed characteristic of ROB wheel 202, RIB wheel 204, LOB wheel 220, and LIB wheel 222 using the data and to determine a performance of ROB brake 206, RIB brake 210, LOB brake 224, and LIB brake 228. In various embodiments, brake controller 110 may include or communicate with one or more processors and one or more tangible, non-transitory memories and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

Figure 2B:
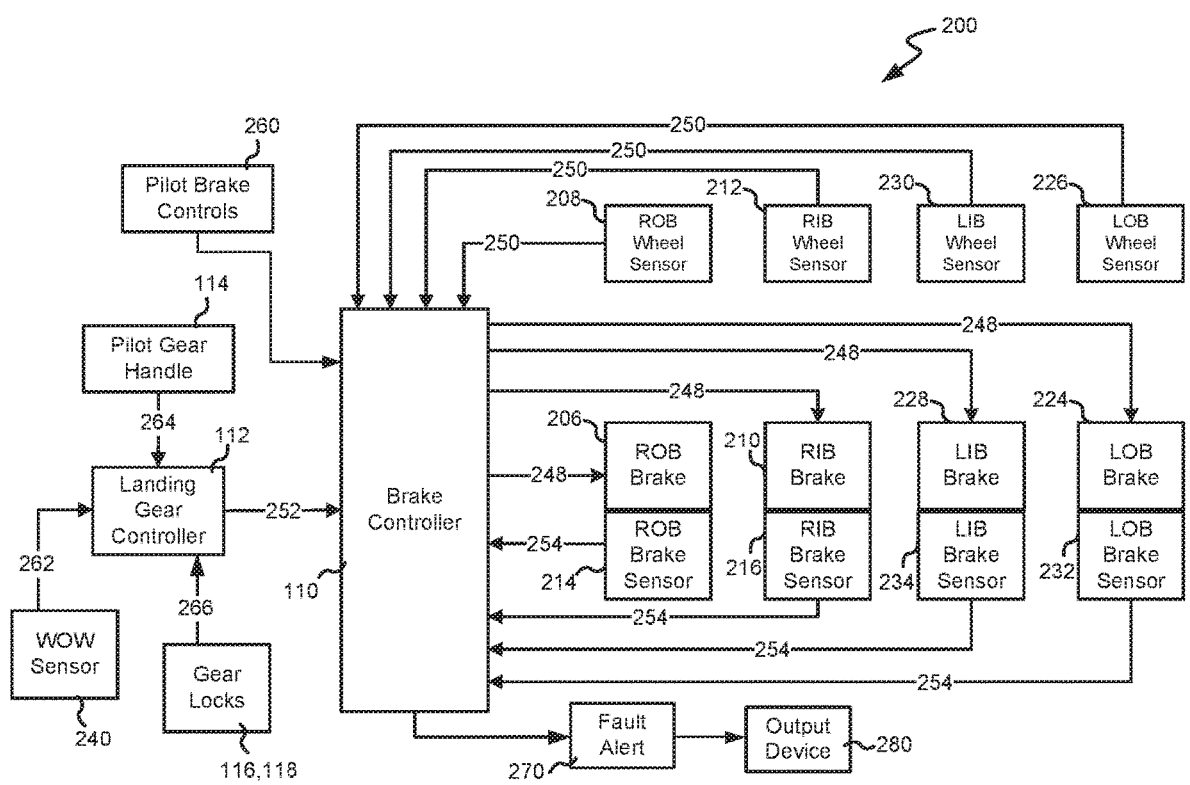
FIG. 2B illustrates a schematic of a system for detecting brake failure using retract braking, in accordance with various embodiments.

With reference to FIG. 2B, a schematic block diagram of system 200 is shown, in accordance with various embodiments. Brake controller 110 may comprise control modules (such as autobraking control, brake control executive, brake pressure control unit, etc.) for controlling ROB brake 206, RIB brake 210, LOB brake 224, and LIB brake 228. As described in further detail below, brake controller 110 may be configured to detect a failure of ROB brake 206, RIB brake 210, LOB brake 224, and/or LIB brake 228 during retraction of the landing gear. Brake controller 110 may be configured to send an apply braking force command 248 to ROB brake 206, RIB brake 210, LOB brake 224, and LIB brake 228. In response to receiving the apply braking force command 248, ROB brake 206, RIB brake 210, LOB brake 224, and LIB brake 228 apply a braking force to the compress the brake disk stack and decelerate ROB wheel 202, RIB wheel 204, LOB wheel 220, and LIB wheel 222. During landing, taxiing, parking, or the like, brake controller 110 may send the apply braking force command 248 in response to, and based on, output from pilot brake controls 260 (e.g., a pilot actuated brake pedal in the cockpit). During retract braking, brake controller 110 sends the apply braking force command 248 in response to, and based on, output received from landing gear controller 112. In this regard, to initiate retract braking, the begin retract braking signal 252 may be sent from landing gear controller 112 to brake controller 110.

In various embodiments, landing gear controller 112 may send the begin retract braking signal 252 in response to receiving a WOFFW signal 262 from WOW sensor 240 and at least one of a gear handle up signal 264 from pilot gear handle 114 or a gear unlocked signal 266 from landing gear locks 116, 118. Gear handle up signal 264 may be configured to indicate pilot gear handle 114 is in a landing gear up position. Gear unlocked signal 266 may be configured to indicate both left and right landing gear 106, 108 are in an unlocked position.

Brake controller 110 is also in communication with ROB wheel sensor 208, RIB wheel sensor 212, LOB wheel sensor 226, and LIB wheel sensor 230. ROB wheel sensor 208, RIB wheel sensor 212, LOB wheel sensor 226, and LIB wheel sensor 230 may transmit wheel speed data 250 (i.e., rotation speed ω) of each respective wheel to brake controller 110. Brake controller may calculate one or more wheel speed characteristic(s) (e.g., an angular velocity or a deceleration) for ROB wheel 202, RIB wheel 204, LOB wheel 220, LIB wheel 222 based on the wheel speed data 250 output, respectively, from ROB wheel sensor 208, RIB wheel sensor 212, LOB wheel sensor 226, and LIB wheel sensor 230. Brake controller 110 may also receive braking feedback data 254 from ROB brake sensor 214, RIB brake sensor 216, LOB brake sensor 232, and LIB brake sensor 234. Braking feedback data 254 may correspond to hydraulic pressure applied to the actuator ram (or the force applied to the electromechanical actuator) of ROB brake 206, RIB brake 210, LOB brake 224, and LIB brake 228. In various embodiments, brake controller 110 may be configured to calculate the braking force being applied by ROB brake 206, RIB brake 210, LOB brake 224, and LIB brake 228 using braking feedback data 254.

In accordance with various embodiments, brake controller 110 may use the wheel speed data 250 received from ROB wheel sensor 208, RIB wheel sensor 212, LOB wheel sensor 226, and LIB wheel sensor 230 and the braking feedback data 254 output from ROB brake sensor 214, RIB brake sensor 216, LOB brake sensor 232, and LIB brake sensor 234 to determine if ROB brake 206, RIB brake 210, LOB brake 224, and LIB brake 228 are operating properly. For example, if the wheel speed characteristic of ROB wheel 202 illustrates that the ROB wheel 202 is not decelerating, even though braking feedback data 254 indicates that braking pressure is being applied by ROB brake 206, brake controller 110 may determine that ROB brake 206 is experiencing a failure. In other words, the lack of deceleration of ROB wheel 202, while ROB brake sensor 214 shows braking pressure, indicates the deficiency in braking force from ROB brake 206 may be a mechanical failure (for example, a jammed or otherwise malfunctioning actuator ram) that is not detectable by ROB braking sensor 214.

In various embodiments, brake controller 110 may compare wheel speed data 250 and/or the wheel speed characteristic calculated from wheel speed data 250 to a threshold wheel speed characteristic to determine if ROB brake 206, RIB brake 210, LOB brake 224, and/or LIB brake 228 is failing. For example, brake controller 110 may compare the deceleration of RIB wheel 204 to a threshold deceleration value to determine if RIB brake 210 is failing. In various embodiments, the threshold deceleration value may be determined using braking feedback data 254 output from RIB brake sensor 216. For example, brake controller 110 may calculate an expected deceleration value based on the braking feedback data 254 being output from RIB brake sensor 216. Brake controller 110 may then determine a difference between the actual deceleration of RIB wheel 204 (i.e., the deceleration calculated from wheel speed data 250 output from RIB wheel sensor 212) and the expected deceleration value (i.e., the deceleration calculated from the braking feedback data 254). If the difference between the actual deceleration of RIB wheel 204 and the expected deceleration is greater than a threshold discrepancy value, brake controller 110 may determine RIB brake 210 is in failure.

In various embodiments, upon recognition of a failure of ROB brake 206, RIB brake 210, LOB brake 224, and/or LIB brake 228, brake controller 110 will order a fault alert 270 to be output by an output device 280. Output device 280 may be configured to communicate information, relating to a health of ROB brake 206, RIB brake 210, LOB brake 224, and LIB brake 228, to the pilot, co-pilot, and/or maintenance crew. For example, in various embodiments, output device 280 includes a display, a speaker, a network access device, and/or the like that sends a message to a remote terminal, an avionics system, or a component located in the cockpit. Brake controller 110 may order output device 280 to output the health status of ROB brake 206, RIB brake 210, LOB brake 224, and LIB brake 228 to the cockpit of the aircraft. Output device 280 may be configured to communicate which brake (e.g., ROB brake 206, RIB brake 210, LIB brake 228, and/or LOB brake 224) is experiencing failure.

Communicating which brake is experiencing a failure condition allows the pilot and/or flight crew to plan accordingly. For example, the pilot may seek a longer runway, burn more fuel before landing, adjust how he/she steers the aircraft or applies the brake during landing, and/or make other changes to the landing procedures, if the pilot is made aware that one or more of the aircraft brakes is unavailable (i.e., in a failure condition). Output device 280 may also include alert to mechanics servicing the aircraft from a centralized system. For example, fault alert 270 may be displayed as a symptom code included in an aircraft health report, which may be reviewed during a post flight check and/or during a routine maintenance inspection.

Figure 3A:
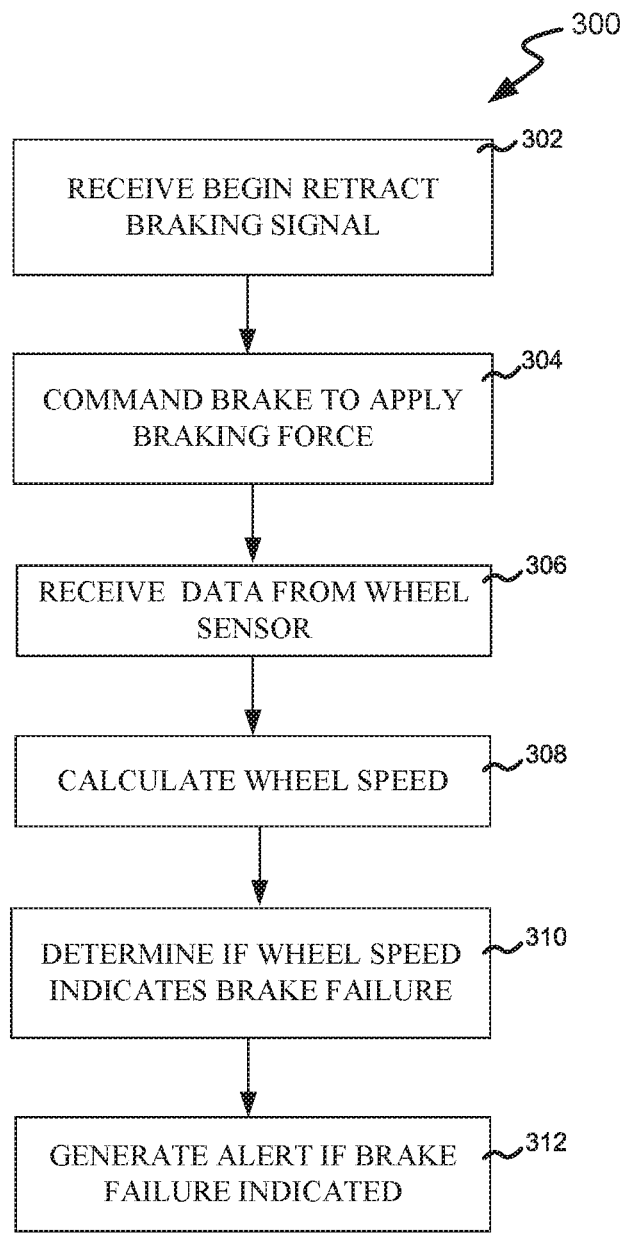
FIGS. 3A and 3B illustrate a method of detecting brake failure using retract braking, in accordance with various embodiments.

With reference to FIGS. 3A and 2B, a method 300 for determining or detecting brake failure during retract braking is shown, in accordance with various embodiments. Brake controller 110 may be capable of carrying out the steps of FIGS. 3A and 3B. Generally, method 300 may be initiated after WOW sensor 240 indicates that weight is off wheels, i.e. WOFFW is true, and pilot gear handle 114 is in the landing gear up position and/or landing gear locks 116, 118 are in an unlocked state, i.e., landing gear locked is false.

With combined reference to FIGS. 3A and 2B, method 300 may be performed by brake controller 110 and may include the steps of receiving a retract braking signal (step 302), commanding braking force be applied (step 304), receiving wheel sensor data (step 306), calculating a wheel speed characteristic (step 308), determining if wheel speed characteristic indicates a failed brake (step 310), and generating a fault alert if brake failure indicated (step 312). In various embodiments, step 302 of method 300 may comprise brake controller 110 receiving begin retract braking signal 252 from landing gear controller 112. In various embodiments, landing gear controller 112 may send begin retract braking signal 252 in response to receiving WOFFW signal 262 from WOW sensor 240 and at least one of gear handle up signal 264 from pilot gear handle 114 or gear unlocked signal 266 from landing gear locks 116, 118. Gear handle up signal 264 may be configured to indicate pilot gear handle 114 is in a landing gear up position. Gear unlocked signal 266 may be configured to indicate left and right landing gear 106, 108 are in an unlocked position.

Step 304 of method 300 may comprise brake controller 304 commanding ROB brake 206, RIB brake 210, LOB brake 224, and LIB brake 228 to apply braking force to ROB wheel 202, RIB wheel 204, LOB wheel 220, and LIB wheel 222. In response to receiving apply braking force commands 248, the brake stacks of ROB brake 206, RIB brake 210, LOB brake 224, and LIB brake 228 may compress to decelerate ROB wheel 202, RIB wheel 204, LOB wheel 220, and LIB wheel 222.

Step 306 of method 300 may comprise brake controller 304 receiving wheel speed data 250 from ROB wheel sensor 208, RIB wheel sensor 212, LOB wheel sensor 226, and LIB wheel sensor 230. Step 308 may comprise brake controller 110 calculating a wheel speed characteristic (e.g., an angular velocity or deceleration) of each of ROB wheel 202, RIB wheel 204, LOB wheel 220, and LIB wheel 222 using the wheel speed data 250 output from ROB wheel sensor 208, RIB wheel sensor 212, LOB wheel sensor 226, and LIB wheel sensor 230. In various embodiments, brake controller 304 may calculate the wheel speed characteristic of ROB wheel 202, RIB wheel 204, LOB wheel 220, and LIB wheel 222 while braking force is being applied by ROB brake 206, RIB brake 210, LOB brake 224, and LIB brake 228 (i.e., after sending the apply braking force command of step 304).

Step 310 of method 300 may comprise brake controller 110 determining if the wheel speed characteristic of ROB wheel 202, RIB wheel 204, LOB wheel 220, and/or LIB wheel 222 indicates a failure of ROB brake 206, RIB brake 210, LOB brake 224, and/or LIB brake 228. For example, the wheel speed characteristic of ROB wheel 202 may illustrate that ROB wheel 202 is not decelerating, thereby indicating a lack of braking force being applied by ROB brake 206. In various embodiments, step 310 may comprise brake controller 110 comparing the wheel speed characteristic to a threshold wheel speed characteristic. In various embodiments, the threshold wheel speed characteristic may be a preselected value coded in brake controller 110. In various embodiments, the threshold wheel speed characteristic may be predetermined, in part, and based, in part, on braking feedback data 254 output from ROB brake sensor 214, RIB brake sensor 216, LOB brake sensor 232, and LIB brake sensor 234. For example, the threshold wheel speed characteristic may decrease as braking pressure increases. In various embodiments, threshold wheel speed characteristic may be determined based upon aircraft size, weight, engine power, brake type, brake size, and/or any other suitable factors.

Step 312 may comprise brake controller 110 generating fault alert 270 in response to determining ROB brake 206, RIB brake 210, LOB brake 224, and/or LIB brake 228 is in a state of failure. In various embodiments, step 312 may include brake controller 110 sending fault alert 270 to output device 280 in the cockpit of the aircraft.

Figure 3B:
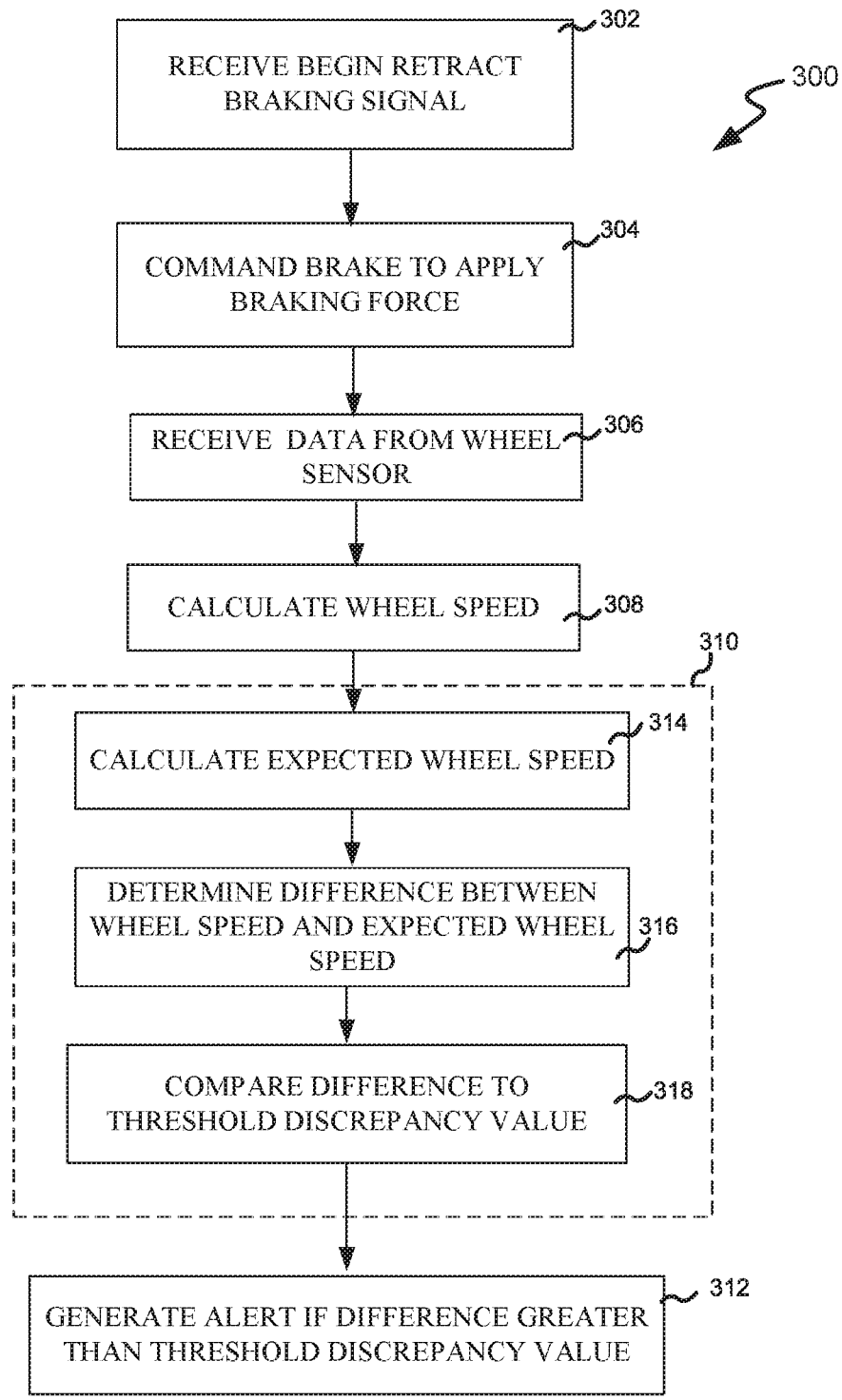

With reference to FIGS. 3B and 2B, in various embodiments, step 310 may comprise brake controller 110 calculating an expected wheel speed characteristic (step 314), determining a difference between the wheel speed characteristic and the expected wheel speed characteristic (step 316), and comparing the difference to a threshold discrepancy value (step 318). In various embodiments, brake controller 110 may calculate the expected wheel speed characteristic (step 314) using braking feedback data 254 output from ROB brake sensor 214, RIB brake sensor 216, LOB brake sensor 232, and LIB brake sensor 234. In various embodiments, brake controller 110 may determine ROB brake 206, RIB brake 210, LOB brake 224, and/or LIB brake 228 is failing based on the difference between actual wheel speed characteristic of ROB wheel 202, RIB wheel 204, LOB wheel 220, or LIB wheel 222 and the expected wheel speed characteristic of ROB wheel 202, RIB wheel 204, LOB wheel 220, or LIB wheel 222 being greater than the threshold discrepancy value (step 312). In various embodiments, the threshold discrepancy value may be a preselected value coded in brake controller 110. In various embodiments, the threshold discrepancy value may be predetermined, in part, and based, in part, on the braking feedback data 254 output from ROB brake sensor 214, RIB brake sensor 216, LOB brake sensor 232, and LIB brake sensor 234. For example, the threshold discrepancy value may decrease as braking pressure increases. In various embodiments, threshold discrepancy value may be determined based upon aircraft size, weight, engine power, brake type, brake size, and/or any other suitable factors.

Employing retract braking to detect brake failure allows system 200 and method 300 to detect dormant brake failures (e.g., a malfunctioning actuator ram) that may be undetectable by current brake monitoring systems that rely pressure sensor data. Detecting and alerting flight crew to a dormant brake failure, may allow the pilot to better mitigate the effects of the brake failure during landing, thereby increasing landing safety and reducing a risk of damage to the aircraft and/or injury to flight crew and passengers.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for detecting aircraft brake failure using retract braking, comprising:
 a landing gear comprising:
  a wheel;
  a brake coupled to the wheel; and
  a wheel sensor coupled to the wheel;
 a brake controller coupled to the brake and the wheel sensor;
 a tangible, non-transitory memory configured to communicate with the brake controller, the tangible, non-transitory memory having instructions stored thereon that, in response to execution by the brake controller, cause the brake controller to perform operations comprising:
  receiving, by the brake controller, a begin retract braking signal;
  commanding, by the brake controller, the brake to apply a braking force to the wheel;
  receiving, by the brake controller, data from the wheel sensor;
  calculating, by the brake controller, a wheel speed characteristic for the wheel based on the data from the wheel sensor; and
  determining, by the brake controller, whether the wheel speed characteristic indicates a failure of the brake;
 a landing gear controller coupled to the landing gear and the brake controller, wherein the landing gear controller is configured to send the begin retract braking signal to the brake controller;
 a weight on wheels sensor coupled to the landing gear, wherein the weight on wheels sensor is configured to send a weight off wheels signal to the landing gear controller;
 a pilot gear handle coupled to the landing gear controller, wherein the pilot gear handle is configured to send a gear handle up signal to the landing gear controller, the gear handle up signal indicating the pilot gear handle is in a landing gear up position; and
 a landing gear lock coupled to the landing gear, wherein the landing gear lock is configured to send a gear unlocked signal to the landing gear controller, the gear unlocked signal indicating the landing gear is in an unlocked position, and wherein the landing gear controller is configured to send the begin retract braking signal to the brake controller in response to receiving the weight off wheels signal and at least one of the gear handle up signal or the gear unlocked signal.

2. The system of claim 1, further comprising a brake sensor coupled to the brake, wherein the brake sensor is configured to output braking feedback data to the brake controller, and wherein determining whether the wheel speed characteristic indicates the failure of the brake comprises:
 calculating, by the brake controller, an expected wheel speed characteristic based on the braking feedback data output from the brake sensor;
 determining, by the brake controller, a difference between the wheel speed characteristic and the expected wheel speed characteristic; and
 comparing, by the brake controller, the difference between the wheel speed characteristic and the expected wheel speed characteristic to a threshold difference.

3. The system of claim 1, wherein the operations further comprise generating, by the brake controller, an alert if the wheel speed characteristic indicates the failure of the brake.

4. The system of claim 3, wherein determining whether the wheel speed characteristic indicates the failure of the brake comprises comparing, by the brake controller, the wheel speed characteristic to a threshold wheel speed characteristic.

5. The system of claim 4, wherein the wheel speed characteristic is at least one of an angular velocity of the wheel or a deceleration of the wheel.

6. A method of detecting aircraft brake failure using retract braking, comprising:
 receiving, by a landing gear controller, a weight off wheels signal from a weight on wheels sensor;
 receiving, by the landing gear controller, at least one of a gear handle up signal or a gear unlocked signal, wherein the gear handle up signal indicates a pilot landing gear handle is in a landing gear up position, and wherein the gear unlocked signal indicates a landing gear in an unlocked position;
 sending, by the landing gear controller, a begin retract braking signal to a brake controller in response to receiving the weight off wheels signal and the at least one of the gear handle up signal or the gear unlocked signal;
 receiving, by the brake controller, the begin retract braking signal;
 commanding, by the brake controller, a brake to apply a braking force to a wheel of the landing gear;
 calculating, by the brake controller, a wheel speed characteristic of the wheel; and
 determining, by the brake controller, whether the wheel speed characteristic indicates a failure of the brake.

7. The method of claim 6, further comprising generating, by the brake controller, an alert if the wheel speed characteristic indicates the failure of the brake.

8. The method of claim 7, wherein determining whether the wheel speed characteristic indicates the failure of the brake comprises:
 calculating, by the brake controller, an expected wheel speed characteristic based on a braking signal output from a brake sensor coupled to the brake;
 determining, by the brake controller, a difference between the wheel speed characteristic and the expected wheel speed characteristic; and
 comparing, by the brake controller, the difference between the wheel speed characteristic and the expected wheel speed characteristic to a threshold discrepancy value.

9. The method of claim 6, further comprising receiving, by the brake controller, data from a wheel sensor coupled to the wheel, wherein the wheel speed characteristic of the wheel is calculated using the data from the wheel sensor.

10. The method of claim 9, wherein the wheel speed characteristic is at least one of an angular velocity of the wheel or a deceleration of the wheel.

11. An article of manufacture including a non-transitory, tangible computer readable storage medium having instructions stored thereon that, in response to execution by a brake controller, cause the brake controller to perform operations comprising:
 receiving, by the brake controller, a begin retract braking signal, the begin retract braking signal comprising a weight off wheel signal and at least one of a gear handle up signal or a gear unlocked signal, wherein the gear handle up signal indicates a pilot landing gear handle is in a landing gear up position, and wherein the gear unlocked signal indicates a landing gear is in an unlocked position;

commanding, by the brake controller, a brake to apply a braking force to a wheel of the landing gear;

receiving, by the brake controller, data from a wheel sensor coupled to the wheel;

calculating, by the brake controller, a wheel speed characteristic of the wheel based on the data; and determining, by the brake controller, whether the wheel speed characteristic indicates a failure of the brake.

12. The article of manufacture of claim 11, wherein the operations further comprise generating, by the brake controller, an alert if the wheel speed characteristic indicates the failure of the brake.

13. The article of manufacture of claim 12, wherein determining whether the wheel speed characteristic indicates the failure of the brake comprises:

calculating, by the brake controller, an expected wheel speed characteristic based on the braking force applied to the wheel;

determining, by the brake controller, a difference between the wheel speed characteristic and the expected wheel speed characteristic; and comparing, by the brake controller, the difference between the wheel speed characteristic and the expected wheel speed characteristic to a threshold discrepancy value.

14. The article of manufacture of claim 13, wherein calculating the expected wheel speed characteristic comprises:

receiving, by the brake controller, braking feedback data from a brake sensor coupled to the brake; and calculating, by the brake controller, the expected wheel speed characteristic using the braking feedback data.

15. The article of manufacture of claim 11, wherein the begin retract braking signal is sent from a landing gear controller.

* * * * *